June 20, 1939.  D. S. KENNEDY  2,163,493
NONSKID DEVICE
Filed May 10, 1938
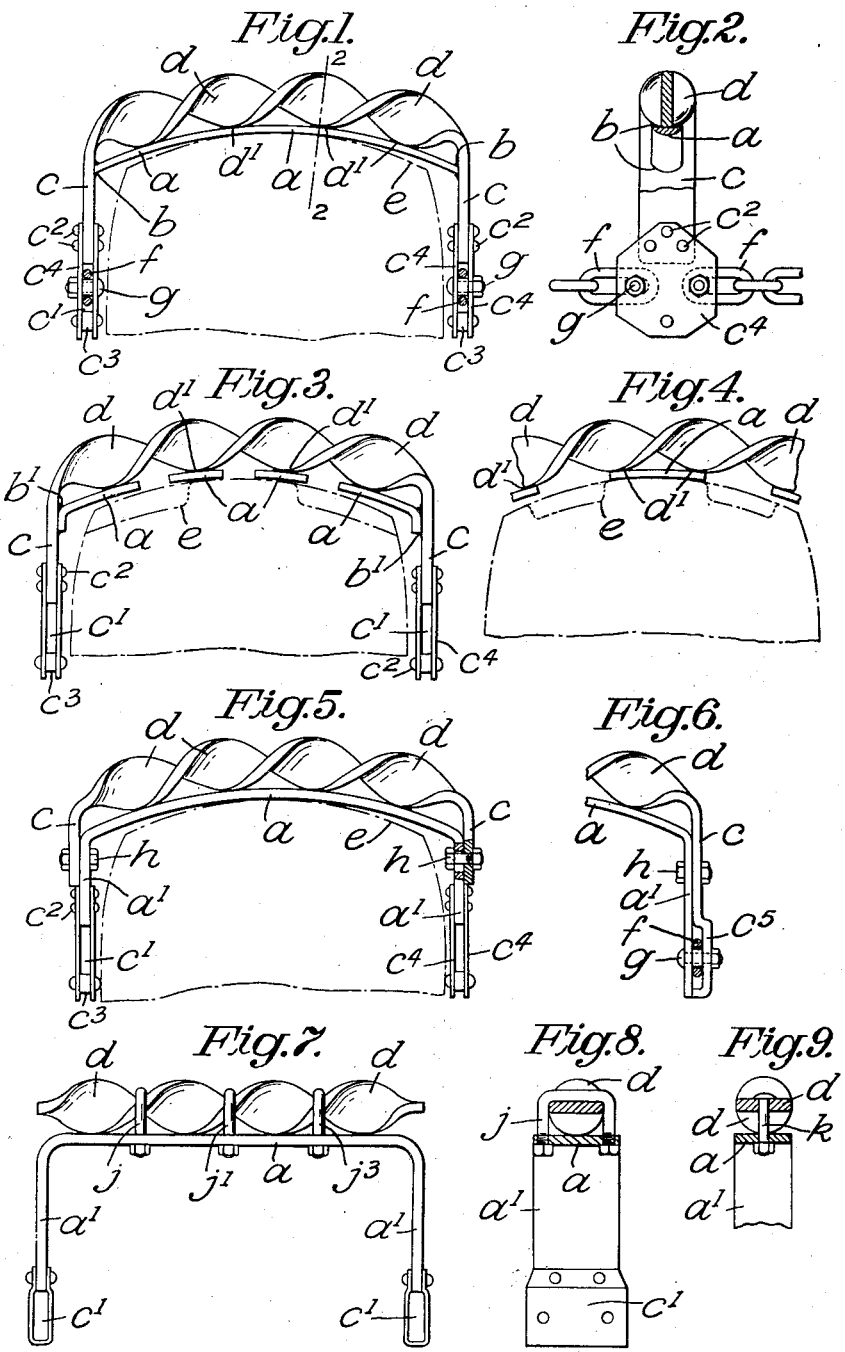
Inventor:
Donald S. Kennedy,
By Smith, Michael & Gardiner,
Attorneys.

Patented June 20, 1939

2,163,493

UNITED STATES PATENT OFFICE 2,163,493

NONSKID DEVICE

Donald Stuart Kennedy, Longparish, England

Application May 10, 1938, Serial No. 207,098
In Great Britain March 25, 1938

12 Claims. (Cl. 152—226)

This invention relates to overall chains or girdles for use upon the tires of vehicle wheels. More particularly the invention relates to detachable overall chains or girdles of the endless type consisting of a series of spaced-apart tread shoes which are connected by lateral retaining-chains, the tread shoes having a creeping movement around the tire during operation.

In my prior patent specification No. 2,095,523, I have described an overall chain with one or more cross members or elements made from metal bar or ribbon of twisted shape. When using overall chains having shoes of that construction in road, cross-country or agricultural work, it is sometimes found that the inner edges of the crests of the transverse twisted element will chafe or wear the rubber tread of the tire, due to the relative creeping movement, and this applies particularly to pneumatic tires with deep patterned treads. One of the objects of the present invention is to prevent or mitigate such chafing or wear. Another object is to increase the rigidity of the twisted element. Other objects will hereinafter appear.

The present invention is described with reference to the accompanying drawing, in which:—

Fig. 1 is a front elevation and Fig. 2 is an end elevation, part section, on line 2—2 of Fig. 1, of a first form of construction.

Fig. 3 is a view similar to Fig. 1 of a modification.

Fig. 4 is a detail view of a further modification of Fig. 1.

Fig. 5 is a front elevation of a second form of construction.

Fig. 6 is a detail view of a modification of Fig. 5.

Figs. 7 and 8 are a front elevation and an end elevation respectively, of a third form of construction.

Fig. 9 is a detail view similar to Fig. 8, showing a modification.

In the arrangement of Fig. 1, the ends of the protective strip or bar $a$ are secured by welding as indicated at $b$, to the inside of the extremital lugs or end portions $c\ c$ of the twisted element $d$, the latter forming one shoe of the endless chain. The element $d$ is slightly arched or bowed axially as seen in Fig. 1, according to the shape of the tread $e$ of the tire, and the bar $a$ is correspondingly arched. Preferably the bar $a$ is substantially parallel with the axis of the twisted or spiral element $d$. The bar $a$ makes contact with the edge of the twisted element at the inner crests of the spirals, and may be welded thereto at those points $d^1$. Since the protective bar is interposed between the tread $e$ of the tire and the inner crests of the spirals, it protects the tire tread $e$ from being chafed by the twisted element.

In cross section, this bar $a$ is preferably of lenticular or D-shape, as may be seen in Fig. 2. In addition to protecting the tire-tread from wear, the bar or strip $a$ increases the rigidity of the twisted element $d$.

The extremital lugs or end portions $c\ c$ are shown parallel to one another where they are prolonged radially towards the center of the wheel. These end portions $c\ c$ are shown provided with pockets, loops or channel housings $c^1\ c^1$ to receive the end-links of lengths of lateral retaining chains $f$, these lengths of chain extending from one shoe to another. The pockets or housings $c^1\ c^1$ are shown formed by parallel plates $c^4\ c^4$ riveted at $c^2$ to the inner and outer faces of the extremities of the end portions $c$ with distance pieces $c^3$ between the other ends of said plates $c^4\ c^4$. The end links of the length of chain are traversed by nut-fitted screw bolts $g$.

In a modified form of the bar $a$ see Fig. 3, the bar $a$ may be interrupted in its length and each portion or short section of the bar $a$ may be welded at $d^1$ to the edge of the inner crest of a spiral, and/or at $b^1$ to the inside of the prolonged end portion or lug $c\ c$ of the twisted elements.

In Fig. 4, the central short section of the bar $a$ is shown welded at $d^1$ to two adjacent wave-crests of the spiral element $d$, so that each end of this central section is welded to a different point on the inner edge of the element. These forms of the protective bar are particularly suited for use with the pneumatic tires of a ploughing tractor, the interrupted sections acting to prevent the shoes from shifting laterally across the tire when the tractor is tilted sideways towards the wheel running in the furrow; the central section of the protective bar rests upon the projections of the tread-pattern, whether the latter includes circumferential ribs with lateral or oblique side strakes, transverse or oblique strakes, a Greek key fret or the like, while the interruptions enable the protective bar to enter the spaces between the tread-projections sufficiently to check any lateral movement of the shoe.

In another form of the invention, see Fig. 5, the twisted element $d$ is provided with end portions $c\ c$ as radially elongated or prolonged end lugs and is secured upon the outside of the protective strip or bar $a$, which is also provided with end portions or radially elongated end lugs $a^1\ a^1$ bearing against the lugs c c of the twisted element, the two sets of end lugs being bolted together by nut-fitted bolts indicated at h. In this arrangement, the protective strip or bar a may be the cross-member or one of the cross members of the shoe and the twisted element d is attached upon the outside of the cross-member by the bolts h h. The twisted element d is thus detachably connected with the bar a.

To ensure the spirals normally bearing upon the bar a, the bolt holes in the lugs $a^1$ are formed as slots (see right hand side of Fig. 5) to allow adjustment of the lugs c in relation to the lugs $a^1$. A pocket or channel housing $c^1$ to carry the end link of the length of retaining chain f is provided upon one or the other end lug, e. g. by forming an offset portion $c^5$ to the lug c which is kept parallel to the lug $a^1$, as indicated in Fig. 6.

Both the strip a and the axis of the twisted element d may be arched across the tread e of the tire to conform approximately with the usual arched tread. Obviously, the nut-fitted bolts h h holding the end lugs of the twisted element d upon those of the protective strip a may be replaced by rivets, but in that case the twisted element d will not be readily detachable from the shoe or strip.

Figs. 7 and 8 show a third form of construction in which the twisted element d which is represented as being axially straight, is suitably clamped or secured upon the outside of a protective rectilinear strip or bar a of metal forming a cross member of the shoe and having in each case lugs $a^1$ directed radially inwards of the wheel, these lugs being preferably parallel to one another and provided with housings or pockets $c^1$ whereby they may be suitably secured to the lateral retaining chains aforesaid. In these Figures 7 and 8 the twisted element d is shown clamped in place by metal straps $j$ $j^1$ $j^2$ embracing the protective inner strip a and located midway between adjacent crests of the spirals of the twisted element d. The metal clamping straps $j$ $j^1$ $j^2$ may be substantially D-shaped extending across the horizontal portions of the blade of the twisted element d with the ends of the strap passing through the strip or bar a and provided with nuts, as represented in Fig. 8.

In Fig. 9, the twisted element is secured to the outer face of the bar a by a nut-fitted bolt k passing through the horizontal portion of the twisted element.

In either arrangement, Fig. 8 or Fig. 9, it will be noted, the twisted element d can be removed whenever desired and when worn can be inverted, thus considerably prolonging its useful life.

The pocket, channel housing or loop at the extremity of each of the radially elongated lugs or end portions of the above-mentioned twisted element d may be broadened or extended fore and aft of the lug or twisted element (see Fig. 8) to facilitate the attachment of the retaining chain-lengths f which extend between adjacent shoes.

What I claim is:

1. In a non-skid device comprising a plurality of shoes and side chains for connecting said shoes around the wheel, said shoes including bars which extend transversely across the tire-tread and are twisted intermediately of their ends, means interposed between said twisted bars and said tire-tread for protecting said tire-tread against the inner edges of said twisted bars, said protective means also extending across the tire-tread and being secured at the ends to the ends of said twisted bars.

2. In a non-skid device of the character described, a shoe consisting of a metal element extending transversely across the tread of the tire, said element being twisted intermediately of its ends and said ends being continued in a direction adapted to extend over the sides of said tire and towards the axis of the wheel, and a protective strip interposed between said twisted element and said tire-tread, said strip also extending across the tire-tread and being secured at its ends to the ends of said twisted element, said protective strip acting also to increase the rigidity of the twisted element.

3. A non-skid device, comprising a series of shoes and lateral chains for connecting said shoes around the wheel, said shoes including bars which extend transversely across the tire-tread and are spirally twisted intermediately of their ends, means for securing said shoes to said chains comprising members extending from opposite extremities of said twisted bars in fixed relation to the radial planes thereof, means for clamping said lateral chains to said members, said clamping means providing a control to maintain said members extending from each of said twisted bars in a substantially radial position by the pull of said connecting chains, and protective means interposed between one of said twisted bars and said tire-tread adapted to shield said tire-tread from the inner edge of said twisted bar, said protective means also extending across the tire-tread and being secured to the ends of said twisted bar in a position between said clamping means and the spirally twisted portions of said bar.

4. A non-skid device comprising a plurality of shoes and side chains for connecting said shoes around the wheel, said shoes including metal bars which extend transversely across the tire-tread and are spirally twisted intermediately of their ends, means for clamping said side chains to the ends of said twisted bars, and a protective member interposed between each of said twisted bars and said tire-tread, said protective member also extending across the tire-tread and being permanently secured at its ends to the ends of said twisted bar.

5. A non-skid device comprising a plurality of shoes and side chains for connecting said shoes around the wheel, said shoes including metal bars which extend transversely across the tire-tread and are spirally twisted intermediately of their ends, means for clamping said side chains to the ends of said twisted bars, and a protective member interposed between each of said twisted bars and said tire-tread, said protective member also extending across the tire-tread and being permanently secured at its ends to the ends of said twisted bar, said protective member being in the form of a strip which is also permanently secured to the inner crests of the spirals of said twisted bar.

6. A non-skid device comprising a plurality of shoes and side chains for connecting said shoes around the wheel, said shoes including metal bars which extend transversely across the tire-tread and are spirally twisted intermediately of their end portions, means for clamping said side chains to the said end portions, and a protective member interposed between each of said twisted bars and said tire-tread, said protective member also extending across the tire-tread and being detachably secured at its ends to the end portions of said twisted bar.

7. A shoe for a non-skid device of the character described, comprising in combination, an arched metal bar twisted intermediately of its end-portions and adapted to be set across the tread of a tire, said end-portions being provided with attachment devices for lateral connecting chains, and a protective strip secured at its ends to the inner faces of the end-portions of said arched metal bar, said protective strip being interposed between the inner edges of the twisted portion of said arched metal bar and acting to increase the rigidity of said arched metal bar.

8. A shoe for a non-skid device of the character described comprising in combination, an inner member extending across the tread of the tire and having end-portions directed in a radial plane of the wheel, means for clamping connecting chains to said end-portions, said clamping means maintaining said inner member and said end-portions in a radial position by the pull of said connecting chains, a metal bar spirally twisted intermediately of its ends, said twisted bar adapted to bear upon the outer face of said inner member, and means for detachably securing said twisted bar to said inner member.

9. A shoe for a non-skid device of the character described, comprising in combination, an arched inner bar extending across the tread of the tire and having ends directed in a radial plane of the wheel, means for clamping connecting chains to said ends, said clamping means maintaining the ends of said arched inner bar in a radial position by the pull of said connecting chains, and a metal bar spirally twisted intermediately of its ends, said spirally twisted bar adapted to bear upon the outer face of said arched inner bar, and nut-fitted screw bolts passing through the ends of said outer twisted bar and the ends of said arched inner bar.

10. A shoe for a non-skid device of the character described, comprising in combination, a spirally twisted metal ribbon, axially arched and adapted to extend across the tire-tread, said ribbon having at its ends attachments for lateral connecting chains, and a protective strip of metal also arched and extending across the tire-tread, said protective strip being substantially parallel with the axis of said spirally twisted ribbon, said protective strip being welded at its ends to the inner face of the ends of said spirally twisted ribbon and being welded also to the edges of the inner crests of the spirals of said spirally twisted ribbon.

11. A non-skid device comprising a plurality of shoes, side chains for connecting said shoes around the wheel, said shoes including bars which extend transversely across the tire-tread and are twisted intermediately of their ends, and means rigidly secured to said bars and adapted to protect said tire-tread against the inner edges of the twisted portions of said bars.

12. A non-skid device comprising a plurality of shoes, side chains for connecting said shoes around the wheel, said shoes including bars which extend transversely across the tire-tread and are twisted intermediately of their ends, and protective metal members rigidly secured to said bars in contact with the inner edges of the twisted portions of said bars, said protective members riding upon said tire tread.

DONALD STUART KENNEDY.